United States Patent [19]
Frisbee et al.

[11] Patent Number: 5,358,342
[45] Date of Patent: Oct. 25, 1994

[54] PIVOT ASSEMBLY WITH GRAVITY LUBRICATION FEATURE

[75] Inventors: Claude M. Frisbee, Schofield; Ronald H. Werner, Edgar, both of Wis.

[73] Assignee: Case Corporation, Racine, Wis.

[21] Appl. No.: 992,475

[22] Filed: Dec. 17, 1992

[51] Int. Cl.5 .................. F16C 11/08; F16C 23/04; E02F 3/76
[52] U.S. Cl. .................. 384/213; 172/827; 384/206
[58] Field of Search .......... 384/192, 193, 205–214, 384/286, 322, 372–379, 385–391, 396–398, 400, 401, 415; 184/5.1, 65; 172/811, 827; 403/10, 11, 35, 37, 38, 122, 131, 134

[56] References Cited

U.S. PATENT DOCUMENTS

| | | | |
|---|---|---|---|
| 1,520,862 | 12/1924 | Faudi | 403/35 |
| 2,885,236 | 5/1959 | Carlson | 384/206 X |
| 3,144,259 | 8/1964 | De Haan | 403/122 X |
| 3,234,670 | 2/1966 | Fryer et al. | 172/827 X |
| 3,645,340 | 2/1972 | Frisbee | 172/804 |
| 3,933,207 | 1/1976 | Frisbee | 172/804 |

FOREIGN PATENT DOCUMENTS

| | | | |
|---|---|---|---|
| 933888 | 6/1982 | U.S.S.R. | 172/811 |
| 1246287 | 9/1971 | United Kingdom | 384/213 |
| 2142990 | 1/1985 | United Kingdom | 384/206 |

OTHER PUBLICATIONS

Case Corporation 1450B Dozers "Designed Reliability" (3 pages) no date.
Case Corporation Parts Sheet 9-2, B871158A-45 no date.

Primary Examiner—Thomas R. Hannon
Attorney, Agent, or Firm—Jansson & Shupe, Ltd.

[57] ABSTRACT

The invention is an improvement in a pivot assembly of the type having an inner, generally spherical bearing and an outer race mounted for movement on the bearing surface and defining a bearing-race sliding contact area. The improvement comprises an enclosed grease chamber above the sliding contact area and in gravity flow communication with such area. The assembly has a lower annular passage which can either be left open to permit grease and dirt to flush from the sliding contact area or such passage may be closed with a dynamic seal. The invention helps exclude dirt from the sliding contact area and helps assure that such area is properly lubricated.

11 Claims, 6 Drawing Sheets

PIVOT ASSEMBLY WITH GRAVITY LUBRICATION FEATURE

FIELD OF THE INVENTION

This invention relates generally to mobile machinery and, more particularly, to pivot assemblies used in mobile construction machinery.

BACKGROUND OF THE INVENTION

The broad class of equipment known as mobile machinery includes machines known as dozers (sometimes called "bulldozers") which have a front-mounted blade for moving and removing earth as well as other materials atop or near the earth surface. Such dozers are sometimes mounted on rubber tires for propulsion. However, urging the dozer blade through the earth requires very high forward force and for that reason, crawler-mounted dozers are in wide use.

Such dozers are propelled by tracks (much like a military tank) and are capable of exerting high forward force on the blade. Such force is possible since the tracks bite into and engage the ground. Track-ground engagement is quite satisfactory for dozer operations and it is sometimes said the track and the ground are "geared" to one another like gear teeth are engaged.

Dozers remove earth in much the same way that a wood plane shaves wood, i.e., by passing a blade across the earth surface and "rolling up" a layer of earth. Such dozers are employed for road construction and to "shape" the exposed surface of the earth to some contour. They are also used to urge earth to one side or the other of the dozer's travel path rather than merely to push earth straight ahead.

The dozer operator is able to raise or lower the blade and to "skew" it left or right. It is this latter capability which permits earth to be urged to one side or the other. And the operator can also tilt the blade so that one end is higher than the other.

In one known arrangement, the dozer blade is mounted somewhat forward of the tractor engine compartment and is attached at two locations, one near the top and one near the bottom of the blade, about midway between the blade ends. More specifically, the lower attachment point is by a pivot assembly coupling the blade to the front of a yoke-like C-frame, the rearward extending arms of which are pinned to the tractor chassis.

Dozers nearly always operate under dirty conditions. Airborne dust, mud particles and the like collect on the machine and one place where such contaminants accumulate is on greasy surfaces including those of pivot assemblies. As a consequence, such assemblies are prone to accelerated wear. The machine manufacturer typically provides an external grease fitting (sometimes called a "zerk" fitting) at such assemblies for periodic greasing by the machine operator. Such fittings, and the grease passages associated with them, are arranged to inject grease directly into the slide-contact "interface" between the assembly outer race and the spherical bearing on which the race moves.

Such pivot assemblies are characterized by at least two disadvantages. One is that for continuing lubrication and reasonable assembly life (particularly in dirty operating environments—the usual case), the assembly must be lubricated frequently, e.g., every ten hours or so of operation. Experience has demonstrated that many machine users simply fail to follow the manufacturer's instructions in this regard.

Another disadvantage is that the lubricant passages (through the zerk fitting and connecting passages into the assembly) often become packed with a mixture of dirt and grease. Such mixture hardens and is difficult to remove—mere application of pressurized grease may well be insufficient to dislodge it. As a result, the machine operator may believe that s/he is effectively lubricating the assembly when, in fact, no fresh grease is being introduced to the vital sliding friction surfaces. Premature wear and failure result.

Examples of known pivot assemblies are shown in U.S. Pat. Nos. 3,645,340 (Frisbee) and 3,933,207 (Frisbee). The assembly shown in the Frisbee '340 patent has two open annular spaces, one each adjacent to the top and the bottom of the bearing-outer race sliding contact area. Such space permits dirt to enter such contact area. The assembly shown in the Frisbee '207 patent uses pliable seals to close such annular spaces and grease is introduced to the sliding contact area along a grease groove. While such seals exclude a certain amount of dirt, that which enters the spaces is trapped there. Both assemblies are mounted on the dozer C-frame by a pair of extended, generally parallel arms, one each above and below the assembly and neither assembly has provisions for continuous lubrication.

An improved joint assembly which extends the time interval at which greasing should be performed and which nevertheless provides for continuous lubrication of vital pivot assembly parts while obstructing entry of dust and dirt would be an important advance in the art.

OBJECTS OF THE INVENTION

It is an object of the invention to provide an improved pivot assembly overcoming some of the problems and shortcomings of the prior art.

Another object of the invention is to provide an improved pivot assembly which is primarily gravity lubricated.

Another object of the invention is to provide an improved pivot assembly which obstructs entry of dirt.

Another object of the invention is to provide an improved pivot assembly which helps assure continuous lubrication of vital pivot assembly parts.

Still another object of the invention is to provide an improved pivot assembly which, in one version, permits grease and dirt to flush from the assembly by gravity.

Another object of the invention is to provide an improved pivot assembly which, in another version, seals the assembly.

Yet another object of the invention is to provide an improved pivot assembly which extends the time interval at which greasing operations should be performed. How these and other objects are accomplished will become apparent from the following descriptions and the drawing.

SUMMARY OF THE INVENTION

The invention is an improvement in a pivot assembly of the type having an inner, generally spherical bearing with a bearing surface and an outer race mounted for movement on the surface. The race and the bearing define a sliding contact area and the improvement comprises an enclosed grease chamber above the sliding contact area and in gravity flow communication with such area. The chamber is defined at least in part by a dome-like cap mounted for movement relative to the bearing and in unison with the outer race.

The contact area is protected from dirt falling into it and, assuming some grease in the chamber, the contact area is continuously lubricated as gravity urges grease into and through such contact area and out an annular passage adjacent to the contact area. Such annular passage is defined at least in part by a race mounting block and by a mounting pin supporting the bearing.

Grease flows from the chamber through and along the contact area, the lower portion of which is bounded by a lower ring-like terminus in gravity flow communication with the annular passage. In one arrangement of the new assembly, the annular passage is open to ambient so that lubricant and dirt entrained with it "flushes" out the bottom. In such arrangement, it is preferred that the assembly include an aperture for periodically replenishing grease in the chamber as it becomes depleted during operation.

In another arrangement, the passage is closed by a seal member between the block and the pin. And the seal member may be of either of two types. One type includes an O-ring which is "dynamic" in that it moves with the mounting block and the race and relative to the mounting pin. Of course, it is preferred that the O-ring be maintained in continuous contact with the mounting plate so that grease does not escape. To help maintain such contact, the mounting pin is inwardly tapered in an upward direction. Certain pivot assembly motion forces the O-ring downward on the pin and the O-ring is thereby stretched. The inwardly tapered mounting pin urges the O-ring (which always tends toward contraction) upward and into contact with the mounting plate to close the annular passage.

In a second type, the seal member is a lip seal which is attached to or near the mounting block and which is "dynamic" in that it moves relative to the mounting pin. In one preferred embodiment, the mounting pin has an outwardly, upwardly flared skirt member and the seal member is in contact with the skirt member. In another embodiment, "upside down" from that described immediately above, the lip seal is attached at the mounting pin and the surface upon which it bears is an inwardly directed skirt member attached or forming a part of the race mounting block. In either embodiment involving the second type of seal member, the lip seal contacts the skirt member to close the annular passage.

The improved pivot assembly has particular utility in combination with a tractor dozer. In a highly preferred arrangement, the spherical bearing is cantilever mounted to a dozer frame and connects the frame and the dozer blade for "three-axis" movement of the blade relative to the frame.

The new pivot assembly overcomes significant disadvantages of earlier assemblies in that such new assembly helps exclude dirt and provides a grease chamber enabling substantially continuous lubrication of the bearing-race sliding contact area. Further details of the invention are set forth in the detailed description and the drawing.

DETAILED DESCRIPTION OF PREFERRED EMBODIMENTS

Figure 1:
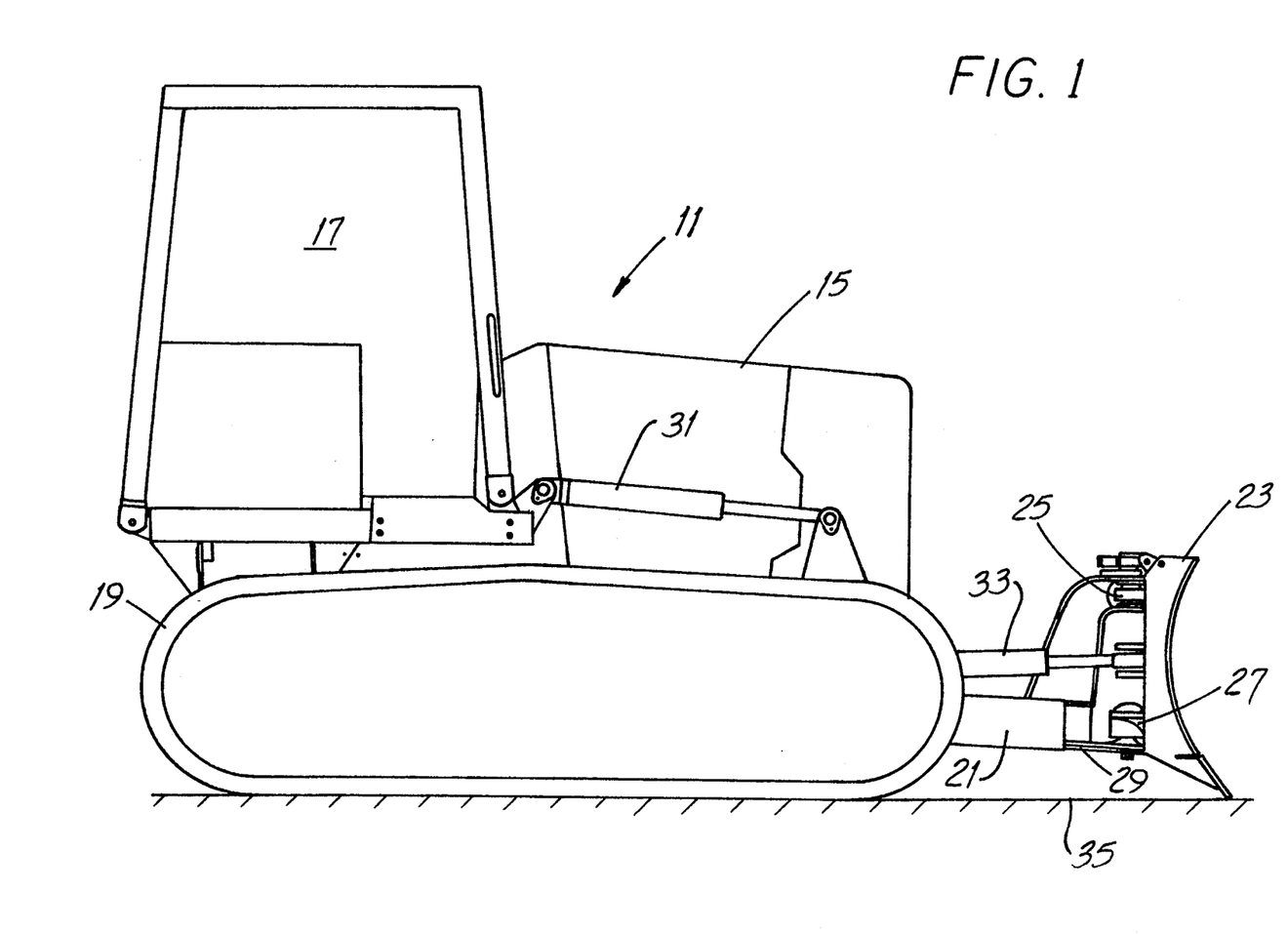
FIG. 1 is a simplified, representative side elevation view of a crawler dozer equipped with the inventive pivot assembly.

Before describing the inventive assembly 10, it will be helpful to understand aspects of a tractor dozer upon which such assembly is used. Referring to FIG. 1, a tractor dozer 11 has a main chassis 13, an engine compartment 15, an operator compartment 17 and a pair of crawler tracks 19, one at either side of the chassis 13. The dozer 11 also includes a C-shaped frame 21, the rearward extending arms of which are pinned to the chassis 13 for pivoting up-and-down frame movement.

The dozer blade 23 is supported on an upper pivot assembly 25 and on a lower pivot assembly 27, the latter being attached to the C-frame 21 and supported thereon cantilever-fashion by a tongue 29 extending from the frame 21. Hydraulic cylinders 31 are used to position the frame 21 and other hydraulic cylinders 33 are used to position the blade 23 on the frame 21.

As is apparent from FIG. 1, the lower pivot assembly 27 is in the path of dirt and debris sliding over the top of the blade 23 and falling down behind it. And such assembly 27 is very close to the earth 35 where dust and mud readily come into contact with it.

Figure 2:
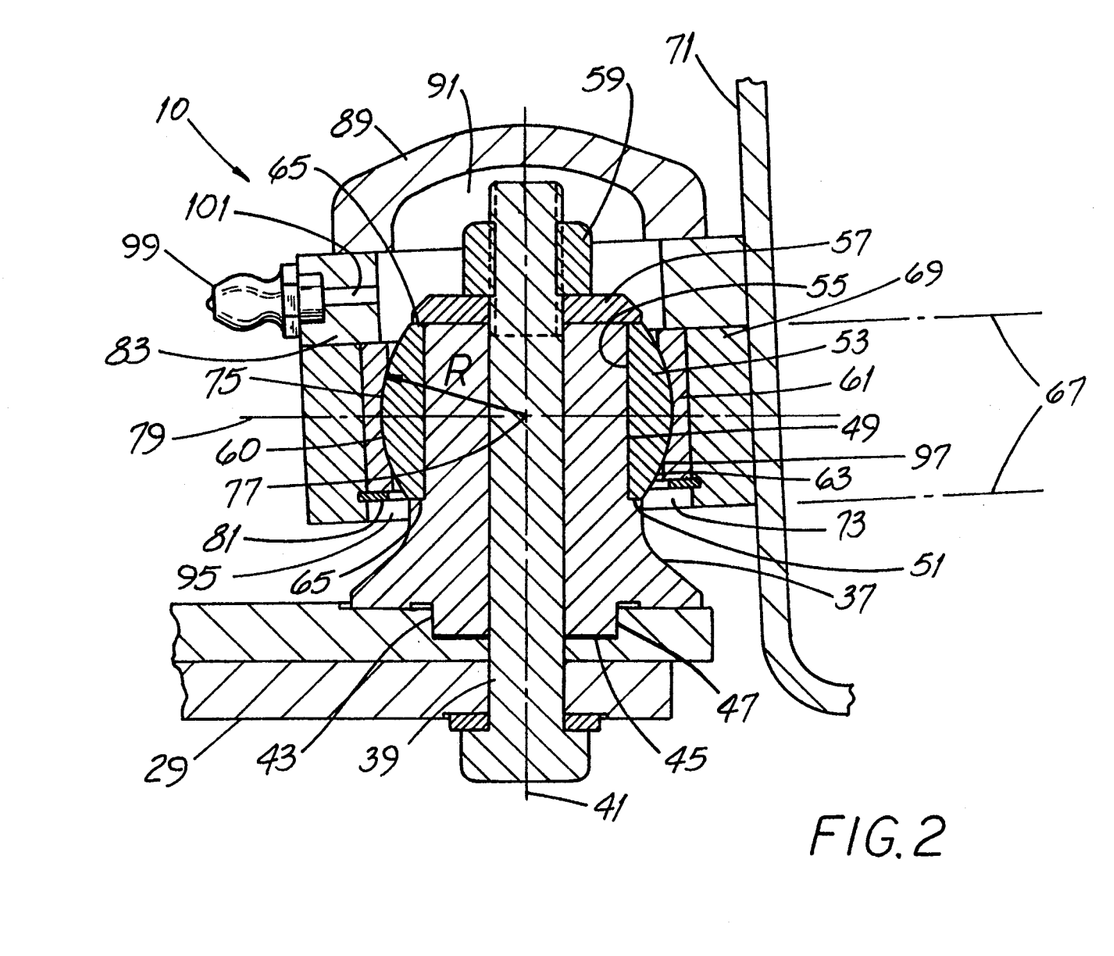
FIG. 2 is a cross-section side elevation view of the pivot assembly generally shown in FIG. 1 and taken along the central vertical axis of the assembly.

As shown in FIG. 2, the assembly 10 has a mounting pin 37 secured to the tongue 29 by a bolt 39 extending along the central assembly axis 41. The base 43 of the pin 37 is "doweled" to the tongue 29 in that such base 43 has a circular, downward-extending boss 45 fitted into a conformably sized and shaped pocket 47 in the tongue 29. Mounting the pin 37 to the tongue 29 in that way helps assure that shear load imposed on the assembly 10 by the blade 23 will be absorbed at the base 43 of the pin 37 and the bolt 39 will not be substantially loaded in shear, only in tension.

The lower portion of the pin 37 is inwardly tapered in an upward direction and abuts a necked-down, generally cylindrical upper portion 49. The portion 49 defines a shoulder 51 which limits downward travel (during manufacturing assembly) of the inner, generally spherical bearing 53 on the portion 49. Such bearing 53 has a cylindrical central aperture 55 sized to fit over the upper portion 49 with closely fitted sliding clearance.

For reasons relating to secure clamping, it is preferred that the vertical height of the bearing 53 be just slightly greater than that of the upper portion 49. A clamp washer 57 and nut 59 are placed on the upper end of the bolt 39 and when the nut 59 is tightened against the washer 57, the bearing 53 is clamped between the washer 57 and the shoulder 51. Such clamping force substantially prevents both the bearing 53 and the mounting pin 37 from rotating with respect to one another and with respect to the tongue 29.

The bearing 53, which together with its race 61 are known per se, may be described as a double truncated sphere with an outer bearing surface 63. Its top and bottom edges 65 are coincident with planes 67 parallel to one another and normal to the central assembly axis 41.

The assembly 10 also includes a mounting block 69 secured to the rear side 71 of the dozer blade 23 and moving with the blade 23. Such block 69 has an interior, generally cylindrical cavity 73 in which is received the outer bearing race 61. In cross-section as shown in FIG. 2, the inner face 60 of the race 61 defines an arc having substantially the same radius of curvature "R" as the surface 63 of the bearing 53 and the region 75 of face-surface contact forms a sliding contact area. The outer race 61 is thus free to move on the surface 63 of the bearing 53 as the blade 23 is positioned.

Freedom of relative blade-frame movement is in three axes. That is, the blade 23 is free to move in a first, "raise-lower" direction, moving the mounting block 69 about an axis normal to the drawing sheet of FIG. 2 and coincident with the center of a circle, a radius of which is "R". It is also free for swinging movement in a second, left-right direction, moving the mounting block 69 about the assembly/bolt central axis 41. And such blade 23 is free to tilt in a third direction, moving the mounting block 69 about an axis 79 coincident with the drawing sheet of FIG. 2 and with circle center.

Figure 3:
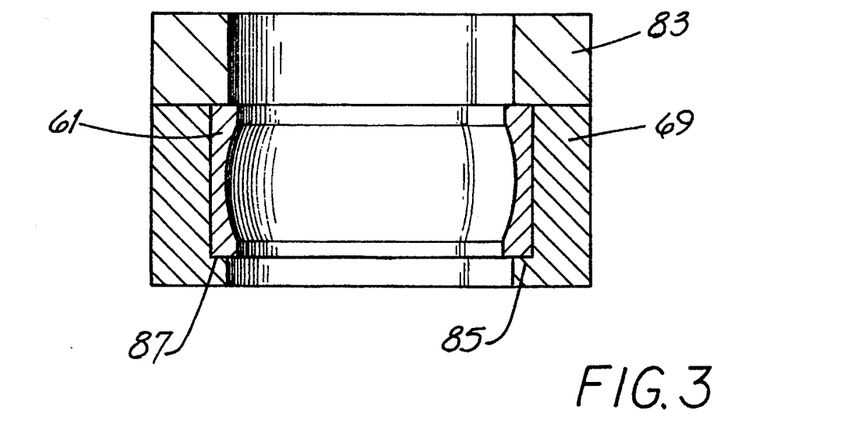
FIGS. 3 and 4 are cross-section side elevation views showing alternate arrangements of the mounting block portion of the assembly shown in FIG. 2.
Figure 4:
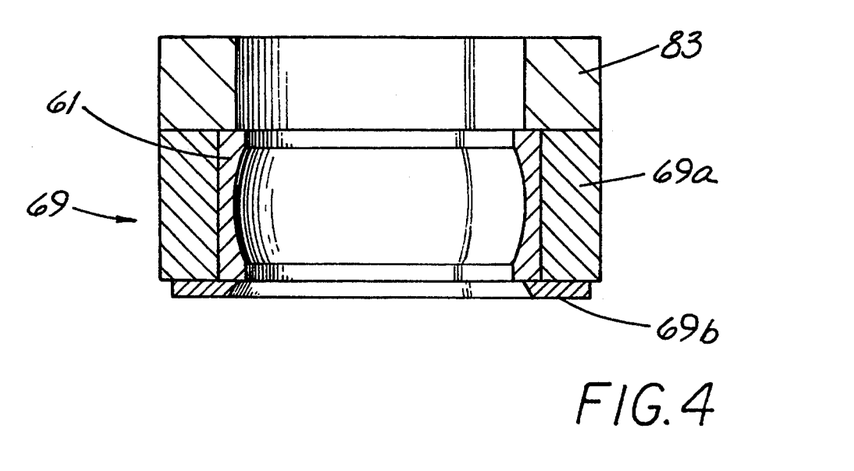

The outer race 61 may be "captured" and clamped within the mounting block 69 in a variety of ways. In the arrangement of FIG. 2, a snap ring 81 is received in a groove in the block 69 and the race 61 is clamped between such snap ring 81 and a top mounting plate 83. In the arrangement of FIG. 3, the mounting block 69 has an inwardly protruding lip 85 forming a shoulder 87 against which the race 61 abuts. Clamping is similarly by a top mounting plate 83. FIG. 4 illustrates a two-piece mounting block 69 including a block ring 69a and a lower block plate 69b. The race 61 is clamped between the top mounting plate 83 and the lower block plate 69b.

Figure 8:
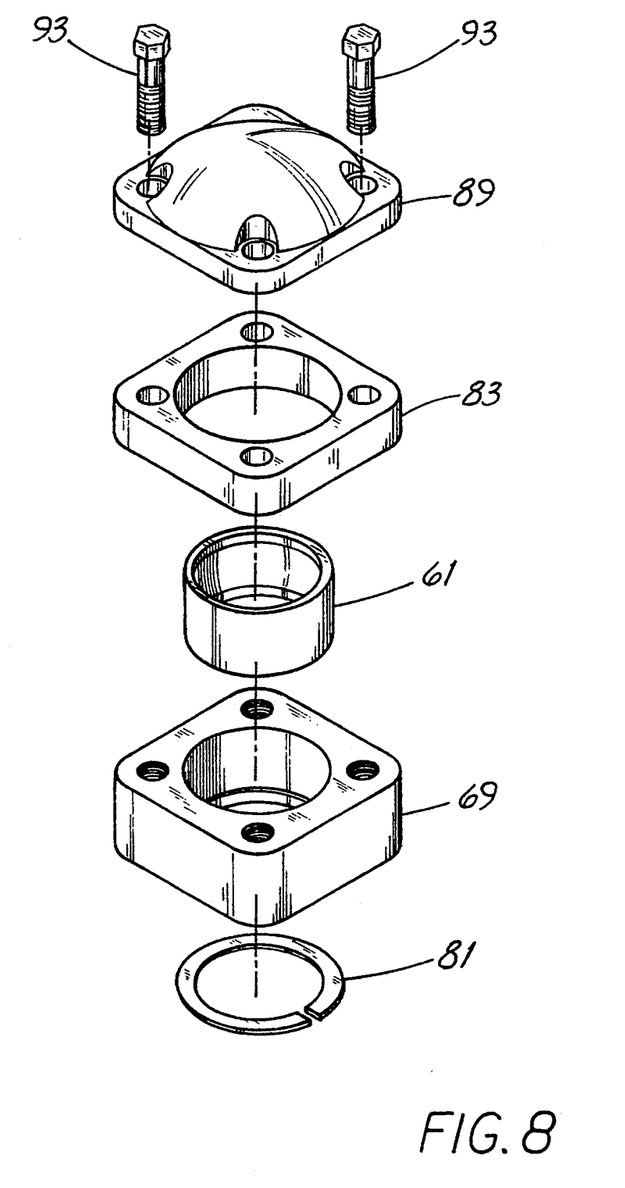
FIG. 8 is an exploded perspective view of a portion of the assembly of FIG. 2 showing the top, dome-like cap, the mounting plate and the mounting block.

Referring again to FIG. 2, the assembly 10 includes a convex, dome-like cap 89 defining an enclosed grease chamber 91. The chamber 91 is above the region 75 of sliding contact area and is in gravity flow communication with it. The cap 89, being attached to the mounting plate 83 and mounting block 69 by bolts 93 (as generally shown in FIG. 8), is mounted for movement relative to the bearing 53 and in unison with the outer race 61.

Space for the grease chamber 91 is made possible by cantilever mounting the assembly 10 on the tongue 29. That is, no upper support tongue is required as with earlier arrangements shown in the aforementioned Frisbee patents.

The assembly 10 has a lower annular passage 95 and the region 75 of sliding contact has a lower ring-like terminus 97 (the lower edge of the region 75) which, being above the passage 95, is in gravity flow communication with the passage 95. In the arrangements of FIGS. 2, 3 and 4, the passage 95 is defined at least in part by the mounting block 69 and by the mounting pin 37 supporting the bearing 53. In the arrangement of FIG. 2, the passage 95 is open to ambient.

Grease which works its way down from the chamber 91 through the region 75 of sliding contact and into the passage 95 carries with it dirt which may have accumulated at the terminus 97 and in and around the passage 95. Thus, while leaving the passage 95 open permits such dirt to be flushed out, grease in the chamber 91 will deplete after a time. Therefore, the assembly 10 includes an external zerk fitting 99 connected to the chamber 91 by a passage 101. Periodic application of a pressurized grease gun to the fitting 99 helps assure at least some grease in the chamber 91.

Figure 5:
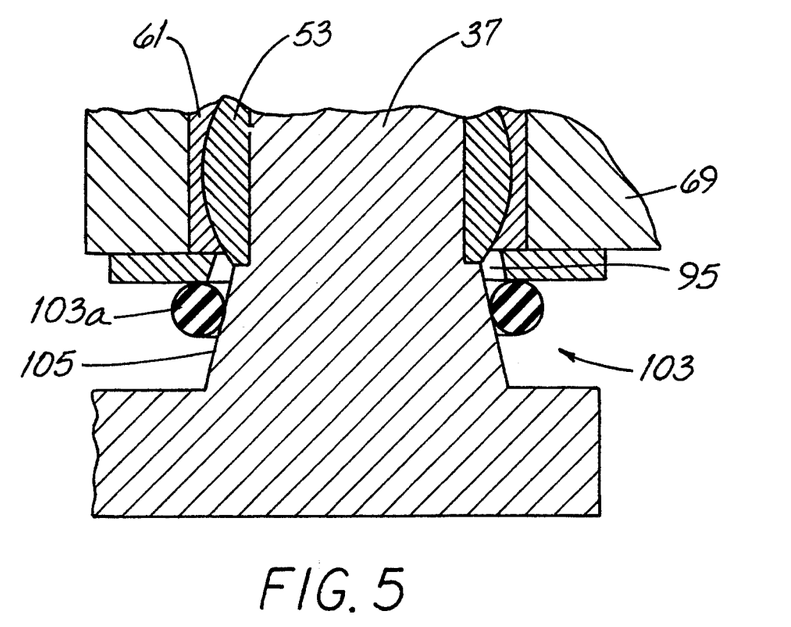
FIG. 5 is a cross-section side elevation view of another embodiment of the pivot assembly shown in FIG. 2. Parts are broken away.
Figure 6:
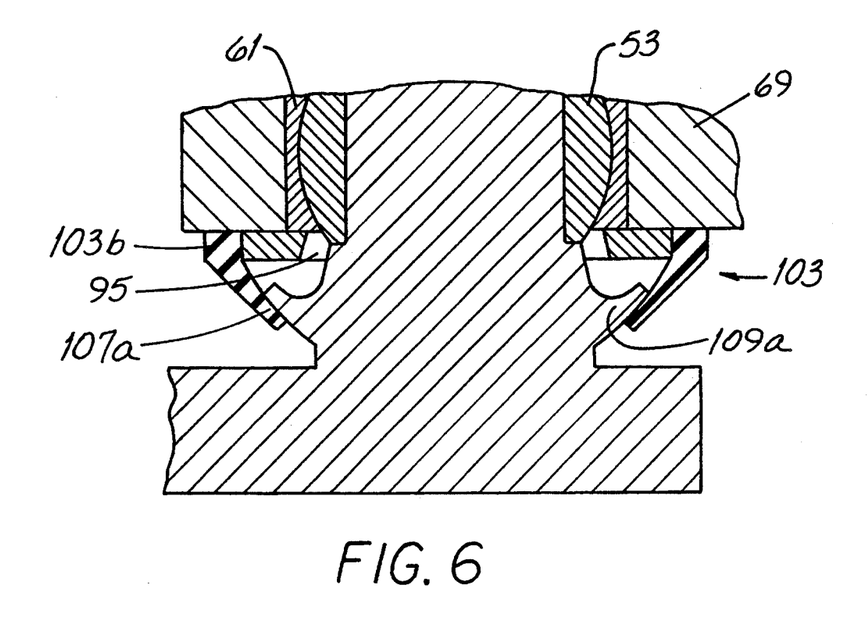
FIG. 6 is a cross-section side elevation view of yet another embodiment of the pivot assembly shown in FIG. 2. Parts are broken away.
Figure 7:
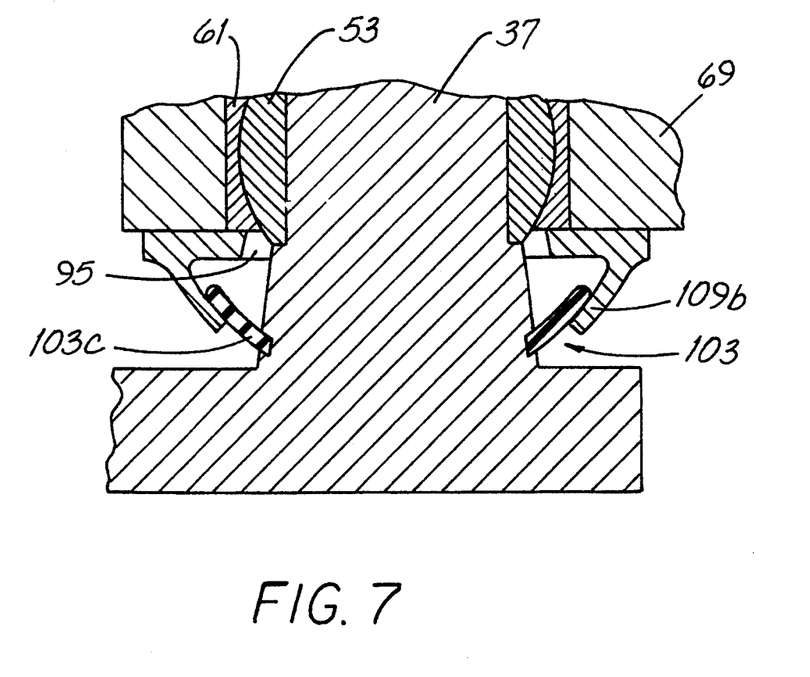
FIG. 7 is a cross-section side elevation view of still another embodiment of the pivot assembly shown in FIG. 2. Parts are broken away.

In the arrangements of FIGS. 5–7, the passage 95 is closed by a seal member 103 between the block 69 and the pin 37. In FIG. 5, closure is by a resilient O-ring 103a which is dynamic. That is as the blade 23 moves in the first or third direction (angle or pitch, respectively), the O-ring 103a moves relative to the mounting pin 37.

It is to be appreciated that as the blade 23 and mounting block 69 move away from the horizontal position shown in FIG. 5, part of the O-ring 103a is urged downward along the lower, tapered portion 105 of the pin 37 and the O-ring 103a is thereby stretched slightly. As the blade 23 and mounting block 69 again move toward the horizontal position, the tension in the O-ring 103a combined with the upward, inward taper of the portion 105 urges the O-ring 103a into continuous contact with the mounting block 69. To put it another way, the O-ring 103a tries to achieve its smallest repose diameter, i.e., that diameter prevailing in an unmounted O-ring 103a.

In the arrangement of FIG. 6, the passage 95 is closed by a seal mounted 103b at the block 69 and having an inward, downwardly directed lip 107a. The mounting pin 37 has an upward, outwardly flared skirt member 109 and the seal 103b is in contact with the skirt member 109 to close the passage 95 and help prevent entry of dirt and exit of grease. FIG. 7 is an "inside out" version of the arrangement of FIG. 6 in that the lip seal 103c is affixed at the mounting pin 37 and the block 69 has a downward, inwardly directed skirt member 109b contacted by the seal 103c. In the arrangement of FIG. 6, the lip seal 103c is a dynamic seal in that it moves relative to the mounting pin 37.

In the arrangements of FIGS. 5–7, the chamber 91 is filled with grease prior to installing the cap 89 to the mounting plate 83. Thereafter, greasing is required only after a very substantial number of dozer operating hours. Except for the arrangement of FIG. 2, re-greasing is by removing the bolts 93 holding the cap 89, removing the cap 89 and re-filling the chamber 91.

While the principles of the invention have been shown and described in connection with only a few embodiments of the assembly 10, it is to be clearly understood that such embodiments are by way of example and not of limitation.

We claim:

1. In combination, (a) a dozer having a frame and a blade and (b) a pivot assembly mounting the blade to the dozer, the assembly having (a) an inner, generally spherical bearing with a bearing surface and (b) a ring-like outer race mounted for movement on the surface and defining a sliding contact area, the improvement comprising:

a dome-like cap above the spherical bearing and spaced therefrom;

an enclosed grease chamber positioned substantially entirely above the sliding contact area and in gravity flow communication therewith, the grease chamber being defined at least in part by the space between the cap and the bearing; and wherein:

the bearing is cantilever-mounted to the frame.

2. The combination of claim 1 including an annular passage and wherein the sliding contact area has a lower ring-like terminus in gravity flow communication with the annular passage.

3. The combination of claim 2 wherein the passage is open to ambient and the assembly includes an aperture for replenishing grease in the chamber.

4. The assembly of claim 2 wherein the annular passage is defined at least in part by a race mounting block and by a mounting pin supporting the bearing and wherein the passage is closed by a seal member between the block and the pin.

5. The assembly of claim 4 wherein the seal member is a dynamic O-ring moving relative to the mounting pin.

6. The assembly of claim 5 wherein the mounting pin is inwardly tapered in an upward direction and urges the O-ring into contact with the mounting block.

7. The assembly of claim 4 wherein the seal member is a dynamic lip seal moving relative to the mounting pin.

8. The assembly of claim 7 wherein the mounting pin has an outwardly flared skirt member and the seal member is in contact with the skirt member.

9. The assembly of claim 4 wherein the race mounting block includes an inwardly directed skirt member and the seal member is a dynamic lip seal contacting the skirt member.

10. The combination of claim 1 wherein the dome-like cap is mounted for movement relative to the bearing.

11. The combination of claim 10 wherein the cap is mounted for movement in unison with the outer race.

* * * * *